(12) United States Patent
Baer et al.

(10) Patent No.: US 7,345,437 B2
(45) Date of Patent: Mar. 18, 2008

(54) RECHARGEABLE VACUUM WITH REDUCED AC VOLTAGE

(75) Inventors: Mark E. Baer, Trout Run, PA (US); Kevin L. Beckstead, Windsor, NY (US)

(73) Assignee: Shop Vac Corporation, Williamsport, PA (US)

( * ) Notice: Subject to any disclaimer, the term of this patent is extended or adjusted under 35 U.S.C. 154(b) by 55 days.

(21) Appl. No.: 11/315,937

(22) Filed: Dec. 22, 2005

(65) Prior Publication Data

US 2007/0145917 A1     Jun. 28, 2007

(51) Int. Cl.
  *H02P 7/74*   (2006.01)
  *H01H 9/00*   (2006.01)
  *H02K 11/00*  (2006.01)

(52) U.S. Cl. .............. 318/107; 318/109; 318/497; 310/68 A

(58) Field of Classification Search ........... 318/107, 318/109, 497; 310/68 A
See application file for complete search history.

(56) References Cited

U.S. PATENT DOCUMENTS

| | | | | |
|---|---|---|---|---|
| 1,389,150 A | * | 8/1921 | Meyer ............. | 318/476 |
| 1,506,754 A | * | 9/1924 | Hutchison ......... | 318/96 |
| 2,174,652 A | | 10/1939 | Casner | |
| 2,807,766 A | * | 9/1957 | Moody et al. ...... | 318/252 |
| 3,668,491 A | | 6/1972 | Kelley et al. | |
| 4,394,612 A | * | 7/1983 | Emerle et al. ..... | 320/152 |
| 4,429,935 A | * | 2/1984 | Lamb et al. ....... | 439/516 |
| 4,476,425 A | * | 10/1984 | Chernotsky et al. .. | 320/143 |
| 4,768,125 A | * | 8/1988 | Byrne ............. | 361/32 |
| 4,774,449 A | * | 9/1988 | Elkins ............ | 320/129 |
| 5,155,674 A | * | 10/1992 | Tanoue et al. ..... | 363/58 |
| 5,160,868 A | * | 11/1992 | Yang .............. | 310/230 |
| 5,596,236 A | * | 1/1997 | Lee et al. ........ | 310/68 A |
| 6,812,657 B2 | * | 11/2004 | Raimondi ......... | 318/107 |
| 6,975,080 B2 | * | 12/2005 | Kitamura et al. ... | 318/109 |

FOREIGN PATENT DOCUMENTS

JP    2003-339600 A    12/2003

OTHER PUBLICATIONS

*International Search Report* corresponding to co-pending International Patent Application Serial No. PCT/US2006/031864, European Patent Office, dated Jan. 2, 2007, 6 pages.

*Written Opinion of the International Searching Authority* corresponding to co-pending International Patent Application Serial No. PCT/US2006/031864, European Patent Office, dated Jan. 2, 2007, 8 pages.

* cited by examiner

*Primary Examiner*—Paul Ip
(74) *Attorney, Agent, or Firm*—Marshall, Gerstein & Borun LLP

(57) ABSTRACT

A motor is disclosed that operates on either AC outlet power or DC battery power with decreased power drop when switching between AC and DC power. The AC power to the motor may be stepped down by using a clipper circuit, while the DC power supplied to the motor may be increased by switching motor field windings from a series wound circuit to a parallel wound circuit. The motor may be used in a vacuum motor embodiment, or in other consumer devices that utilize electric motors.

18 Claims, 9 Drawing Sheets

US 7,345,437 B2

RECHARGEABLE VACUUM WITH REDUCED AC VOLTAGE

FIELD OF THE DISCLOSURE

The present invention relates generally to electrical motors that may be used in consumer rechargeable products, and more particularly to a motor that accommodates both alternating current and direct current power sources.

BACKGROUND OF THE DISCLOSURE

Existing rechargeable devices, such as vacuum cleaners, may use a direct current (DC) motor that is powered by a rechargeable battery, where the battery is charged by an auxiliary circuit connected to an alternating current (AC) power supply, such as a standard wall outlet. When the device is plugged into the AC power supply, the AC supply is effectively converted to DC and used to charge the battery while providing power to the DC motor. When the AC power supply is removed, the battery may continue to provide DC power to the motor. When AC power is used, the AC is converted into DC and stepped down to match the battery power level. DC motors using battery supplied power may be relatively weak compared to AC power motors using the same outlet source.

In other consumer devices, a universal motor may be used to power the device. Universal motors accept both AC and DC power without the need for an AC-DC conversion circuit. These universal motors are usually series wound circuits in which the motor field coils are connected in series. The problem with universal motors is that often, the voltage from an AC source is higher than the voltage from a DC battery, and thus a huge power discrepancy exists in switching between an AC outlet source and DC battery power supply. This difference in power is very noticeable and further highlights the poor performance of a universal motor using battery-only power.

Therefore, there is a need to provide a circuit for a rechargeable motor that will enable the motor to run on both an AC outlet source and DC battery, preferably with less discrepancy in power when switching between AC and DC power.

SUMMARY OF THE INVENTION

The claimed method and system provide an electric motor that runs on AC and DC power with a reduced motor power difference when switching between an AC power source and a DC power source. The AC voltage to the motor may be stepped down by using a clipper circuit, while the DC power supplied to the motor may be increased by switching motor field windings from a series wound circuit to a parallel wound circuit.

While the specific method and system will be described to apply to a vacuum motor embodiment, it is emphasized that this system may be applied to other consumer devices that utilize electric motors.

DETAILED DESCRIPTION

Although the following text sets forth a detailed description of the claimed invention it is to be construed as exemplary only and does not describe every possible embodiment. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims is referred to in this patent in a manner consistent with a single meaning, that is done for sake of clarity only, so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
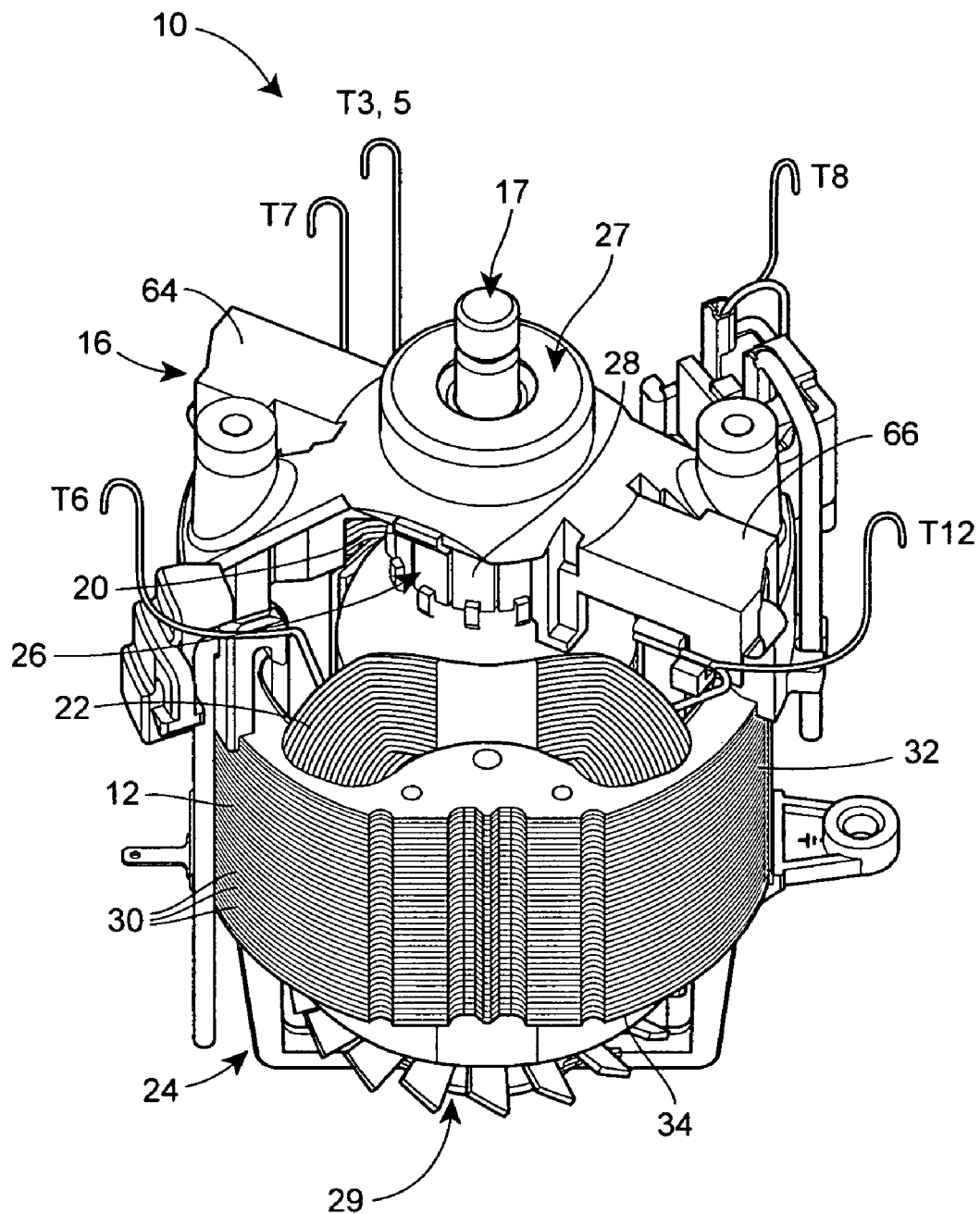
FIG. 1 illustrates a perspective view of the front of an electric motor embodiment of the claimed invention.

Referring now to the drawings, and particularly to FIG. 1, an example of an electric motor 10 is disclosed. The motor 10 includes a stator 12, a lower housing 16 (shown on the top in FIG. 1), and an upper housing 24. Supported by the stator 12 is a set of coils, including a first coil 20 forming a first pole and a second coil 22 forming a second pole. Fastened to the stator 12 is the upper housing 24. An armature, indicated generally at 26, mounted on a motor shaft 17 with a commutator 28 is rotatably mounted by a lower bearing 27 within the lower housing 16 and an upper bearing 29 within the upper housing 24, and is rotatable about shaft 17, as is known in the art. While the described embodiment illustrates only two coils, it should be noted that any number of coils could be included in the stator and similar parallel connections can be made between each field coil.

The stator 12 can comprise a series of laminations 30, each of which is an annular plate with a large interior opening. The laminations 30 can be made from cold rolled steel, for example SAE 1010 or 1008, and can be welded together via plasma welding, as is known in the art. By stacking several laminations 30, a tubular shape with an exterior annular surface 32 and an interior annular surface 34 (See FIG. 2) is created.

Figure 2:
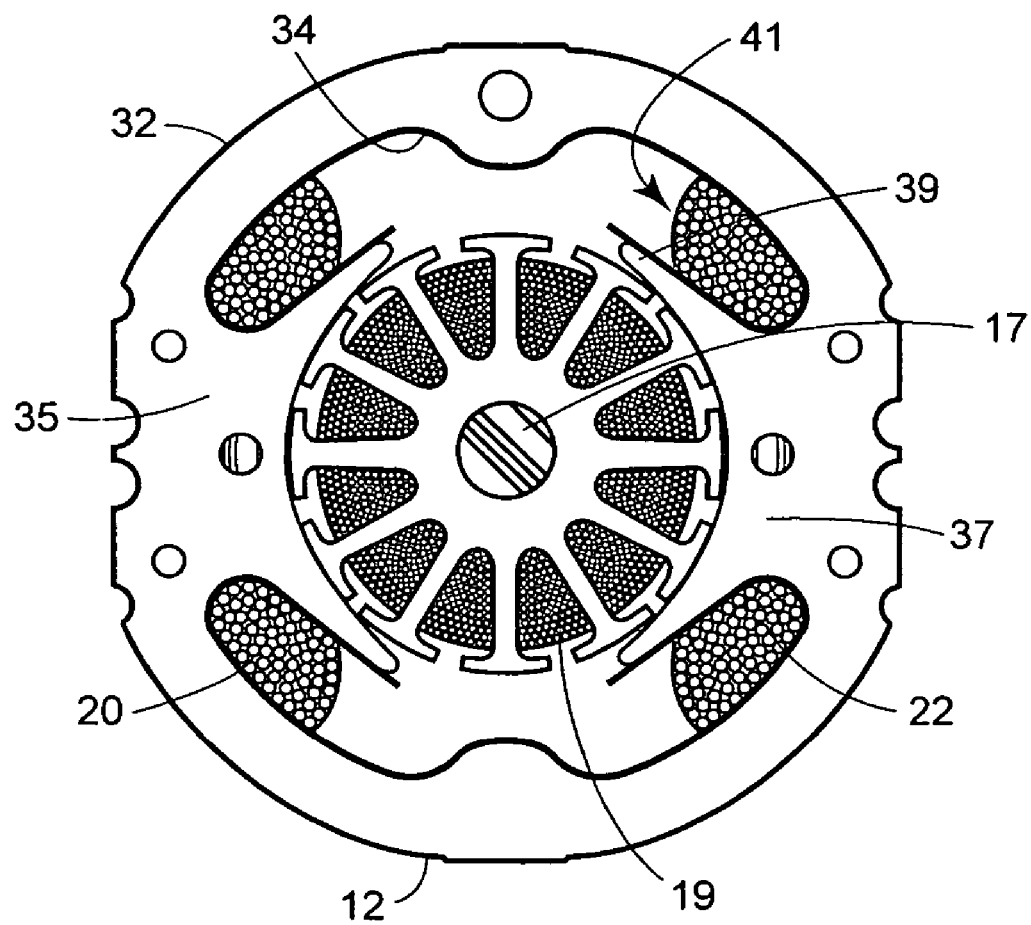
FIG. 2 is a top sectional view of the electric motor of FIG. 1.

As illustrated in FIG. 2, the interior annular surface 34 also includes a first hook-like protrusion 35 and a second hook-like protrusion 37, each of which project inwardly towards the center of shaft 17 supporting armature windings 19. The first protrusion 35 is used to support the first coil 20, while the second protrusion 37 is used to support the second coil 22, as is commonly known. Each of the first protrusion 35 and the second protrusion 37 include pole tips 39 that define kidneys 41.

Lower Housing

Figure 3:
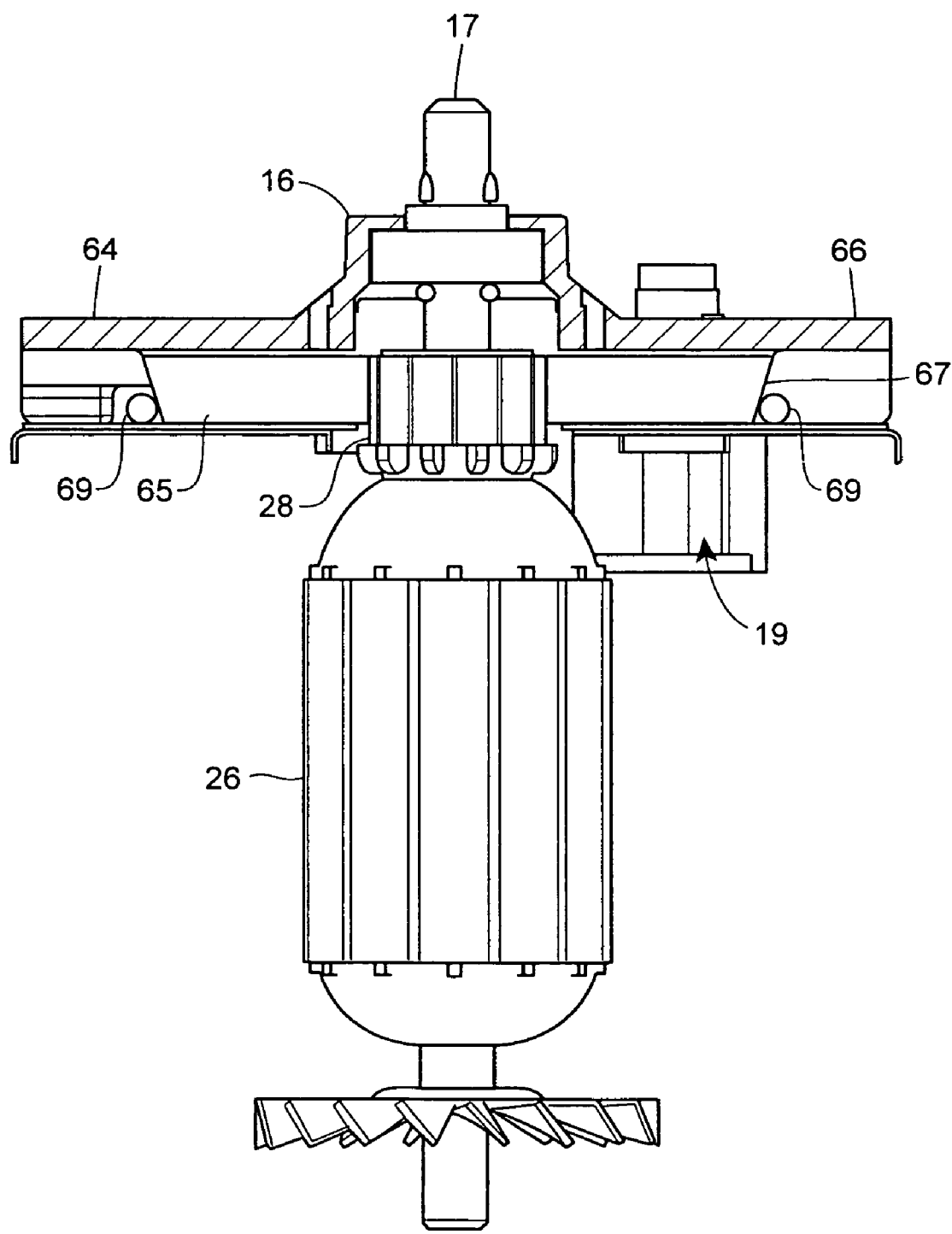
FIG. 3 illustrates a side perspective view of the rotor, winding board, and lower housing of electric motor of FIG. 1.
Figure 4:
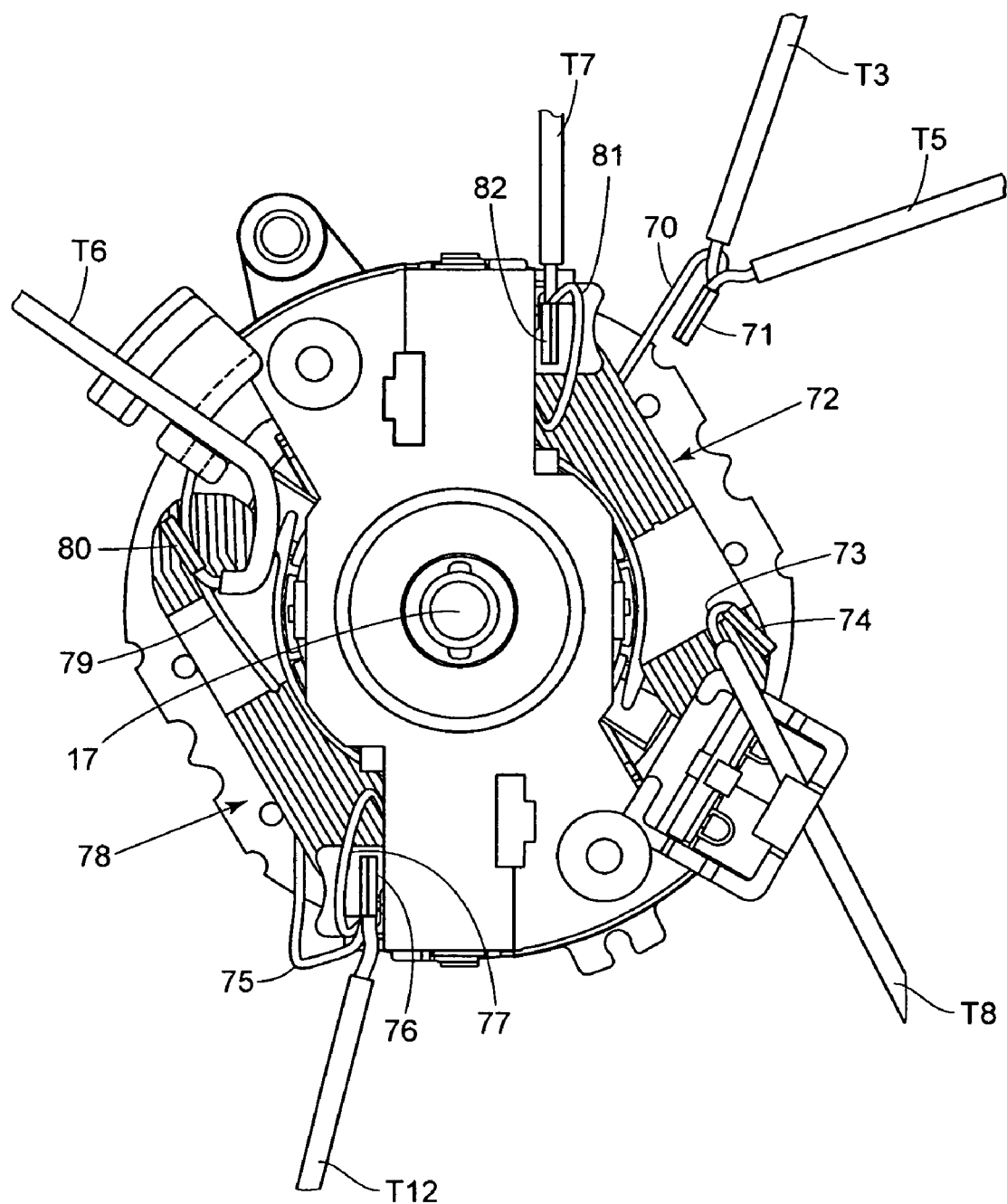
FIG. 4 illustrates a top view of the electric motor of FIG. 1.

The lower housing 16, best seen in FIGS. 1 and 3, may be coupled to the upper housing 24 using a bracket 19 (partially shown in FIG. 3), and includes structure to receive current from the coils 20, 22 and carry it to and from the armature 26.

The lower housing 16 may be made of a non-conductive material, for example a thermoplastic such as a glass-filled polyester. The lower housing includes a first brush housing 64 and a second brush housing 66. Disposed within each brush housing 64, 66 is an electrically conductive brush 65, 67, which is urged, usually by a spring-loaded member 69, radially inward toward shaft 17 and the armature 26. As is known in the art, the brushes 65, 67 transmit current to the rotating armature 26 through the commutator 28.

Physical Wiring

Referring now to FIGS. 1-4, the wiring of the motor 10 will be described. In general, the wiring of motor 10 may consist of a first magnet wire and a second magnet wire. The first magnet wire may be illustrated (FIG. 4) as having a first start end 70 connected to a terminal connector 71, a first field coil portion 72, and a first finish end 73 connected to a connector 74. The second magnet wire may be illustrated as having a second start end 75 connected to a terminal connector 76, a second field coil portion 78, and a second finish end 79 connected to a connector 80.

The first magnet wire is wrapped many times around the first hook-like protrusion 35 of the stator 12, as shown in FIG. 2, to form the first coil 20. The length of the first magnet wire disposed within the first coil 20 is known as the first coil portion 72. The connector 71 may connect the first start portion with a terminal wire T3 and a terminal wire T5 and the connector 74 may connect the first finish portion to a terminal wire T8.

A first brush wire 81 has a first end disposed on a connector 82 and a second end disposed on the first brush housing 64. The first brush wire 81 is electrically connected to the first brush 65 slidingly disposed within the first brush housing 64 (See FIG. 3), as is known in the art. The connector 82 may connect the first brush wire 81 to a terminal wire T7.

As shown in FIG. 3, the first brush 65 is urged forward to the motor shaft 17 and into physical and electrical contact with the commutator 28 and the armature 26. The armature 26 spins around the axis of shaft 17 while in contact with the first brush 65.

A second brush 67 is disposed within the second brush housing 66 opposite the first brush housing 64. The second brush 67 is also urged forward into contact with the armature 26. A second brush wire 77 connects the second brush housing 66 to the connector 76, such that the second brush wire and second start wire are electrically contacted. The connector 76 may connect the second brush wire 77 and second start wire to a terminal wire T12.

The second magnet wire may also be a single wire having a second finish end 79, a second coil portion 78, and a second start end 75. The second magnet wire is wrapped many times around the second hook like projection 37 of the stator 12, as shown in FIG. 2, to form the second coil 22. The length of the first magnet wire disposed within the second coil 22 is known as the second coil portion 78. The second magnet wire then exits the second coil 22 and is connected to the connector 80. The connector 80 may be connected to a terminal wire T6.

Series and Parallel Field Coil Circuits

Figure 5:
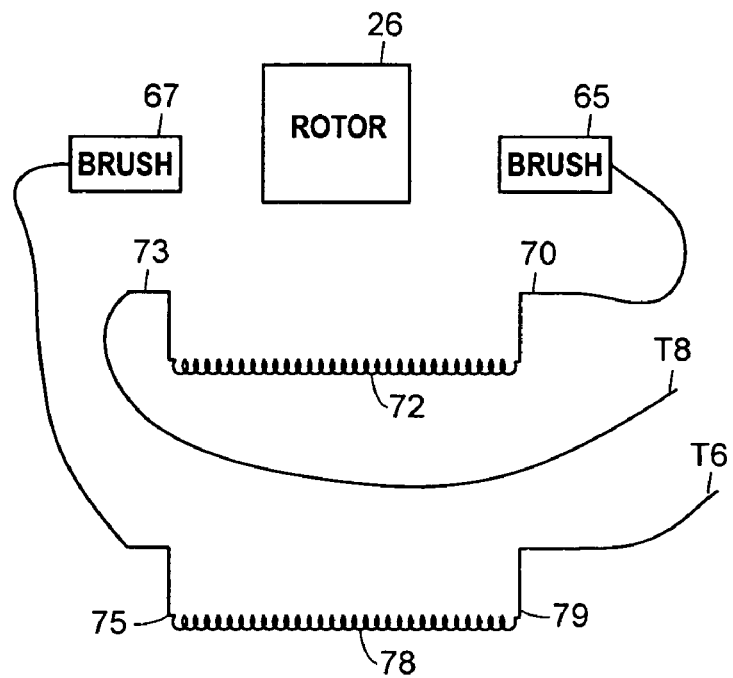
FIG. 5 is an electro-mechanical diagram of a series wound AC motor circuit used in an embodiment of the claims.
Figure 6:
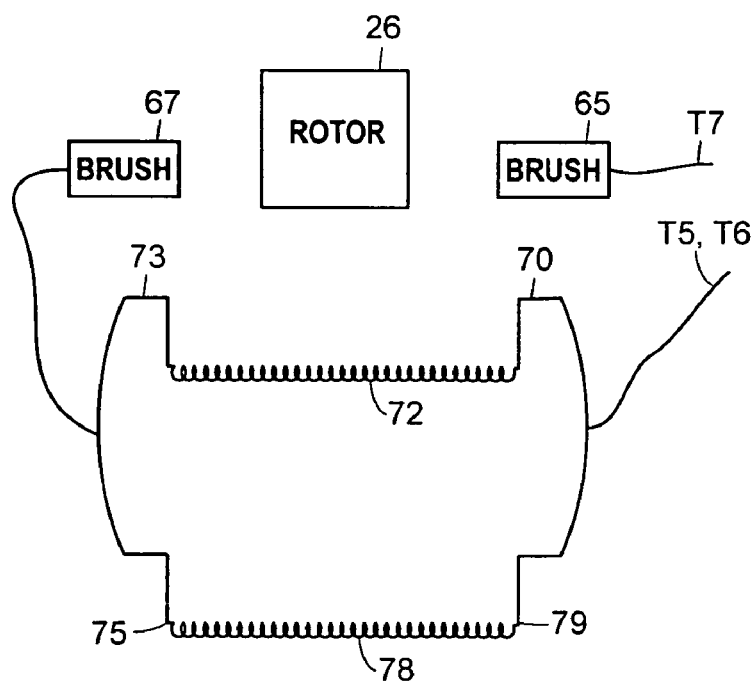
FIG. 6 is an electro-mechanical diagram of a parallel wound DC motor circuit used in an embodiment of the claims.

FIG. 5 illustrates an electrical diagram of an AC series wound field coil circuit, while FIG. 6 illustrates an electrical diagram of a DC parallel wound field coil circuit. Generally, an AC power source may be connected through a switch consisting of a first terminal T8 and a second terminal T6. In the series field coil circuit, the first terminal T8 may be connected to the finish end 73 of the first field coil 72. The start end 70 of the first field coil 72 may be connected to a first brush 65. The first brush 65 may electrically contact a rotor, or armature 26, which may also electrically contact the second brush 67. The second brush 67 may be connected to the start end 75 of the second field coil 78. The finish end of the second field coil 79 may be connected to the second terminal T6, thereby forming a series field coil circuit.

Generally, a DC power source may be connected through a switch consisting of a terminal T5, a terminal T6, and a terminal T7. In the parallel field coil circuit, the first terminal T7 may be connected to the first brush 65. The first brush 65 may electrically contact the rotor 26, which may also electrically contact the second brush 67. The second brush 67 may be connected to the finish end 73 of the first field coil 72. The start end 70 of the first field coil 72 may be connected to the second terminal T5,T6 of the switch. The second brush 67 may also be connected to a start end 75 of a second field coil 78. A finish end 79 of the second field coil 78 may be connected to the second terminal T5,T6 of the switch, thereby forming a parallel field coil circuit.

Current Flow and Use of Motor

With reference to FIGS. 1-4, the current flow will now be described for an AC series field coil circuit. Current may be supplied to the motor 10 by a two terminal power source (not shown). Current flows from a first power source terminal through the first finish wire 73 and into the first coil portion 72 and through the first coil 20. Current then travels out of the first coil 20 and through the connector to the first brush wire 81 and into the first brush 65.

The first brush 65 is electrically conductive and is urged into contact with the commutator 28 on the armature 26, thereby supplying current to the armature 26. The energized armature 26 is also in contact with the second brush 67 inside the second brush housing 66. Current flows through the second brush 67 and into the second brush wire 77 that is connected to the second start wire 75. Current then flows from the second start wire 75 into the second coil wire, thereby energizing the second coil 22. Finally, current flows through the second finish wire 79 out to a second power source terminal. As is known in the art, a current flowing through the first coil 20 and the second coil 22 generates a magnetic field. The armature 26, with current flowing through it, is induced to rotate about the shaft 17.

The current flow for a parallel DC field coil circuit will now be described. Current may be supplied to the motor 10 by a two terminal DC power source (not shown). Current flows from a first power terminal through the first brush wire 81 to the first brush 65. The first brush 65 is electrically conductive and is urged into contact with the commutator 28 on the armature 26, thereby supplying current to the armature 26. The energized armature 26 is also in contact with the second brush 67 inside the second brush housing 66. Current flows through the second brush 67 and into the second brush wire 77. Current then flows from the second brush wire through the first finish wire 73, through first coil portion 72, and through the first coil 20. Current then flows out of the first coil 20 through the first start wire 70 and to a second terminal of the power source.

In this parallel circuit, the first finish wire 73 is also connected to the second start wire 75 and the second finish wire 79 is connected to the first start wire 70, thereby forming a parallel coil combination. Thus, current also flows from the second brush 67 to second start wire 75 into the second coil portion 78, thereby energizing the second coil 22. Current then flows through the second finish wire 79 to the power source. As in the series circuit, the first brush 65 supplies current to the armature 26 and the energized armature 26 is also in contact with the second brush 67 inside the second brush housing 66. Current flows through the second brush 67 and into the second brush wire 94 and into the parallel coils. As is known in the art, a current flowing through the first coil 20 and the second coil 22 generates a magnetic field. The armature 26, with current flowing through it, is induced to rotate about the shaft 17. Further, the physical arrangement of the coils and the polarity of the DC power supply may determine the direction of rotation, as known in the art, and thus in an embodiment of the claims, the arrangement of the coils or the polarity of the DC supply may be adapted so that the direction of rotation of the armature is the same for both AC and DC power.

Figure 7:
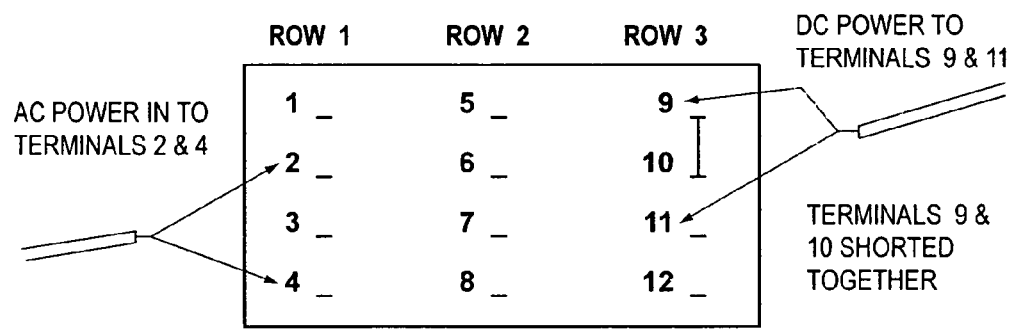
FIG. 7 illustrates a switching apparatus that may be used in an embodiment of the claims.

FIG. 7 illustrates a switch that may be used to connect between the AC and DC power sources, on the one hand, and the series field coil circuit and the parallel field coil circuit, described above, on the other. The switch may be a four pole, double throw switch that is commercially available. However, other types of switches having different configurations may also be used, as known to those skilled in the art. The 4-pole, double throw switch may consist of 12 terminals T1-T12, that may be divided into three rows. In a first position, the switch may connect T1 with T5, T2 with T6, T3 with T7, and T4 with T8. In a second position, the switch may connect T5 with T9, T6 with T10, T7 with T11, and T8 with T12.

In one embodiment of the claims, a DC powered parallel circuit may be switched to an AC powered series circuit using the switch of FIG. 7. In this embodiment, the terminal wires of FIG. 5, T3, T5, T6, T7, T8, and T12 are connected to respectively marked terminals of FIG. 8. Further, a first and second terminal of an AC power source may be connected to T2 and T4 of FIG. 7, and a first and second terminal of a DC power source may be connected to T9 and T11. In this embodiment, T9 is also connected to T10. When the switch is in the first position, the AC series circuit described above is connected. When the switch is in the second position, the DC parallel circuit described above is connected.

Clipper Circuit

Figure 8:
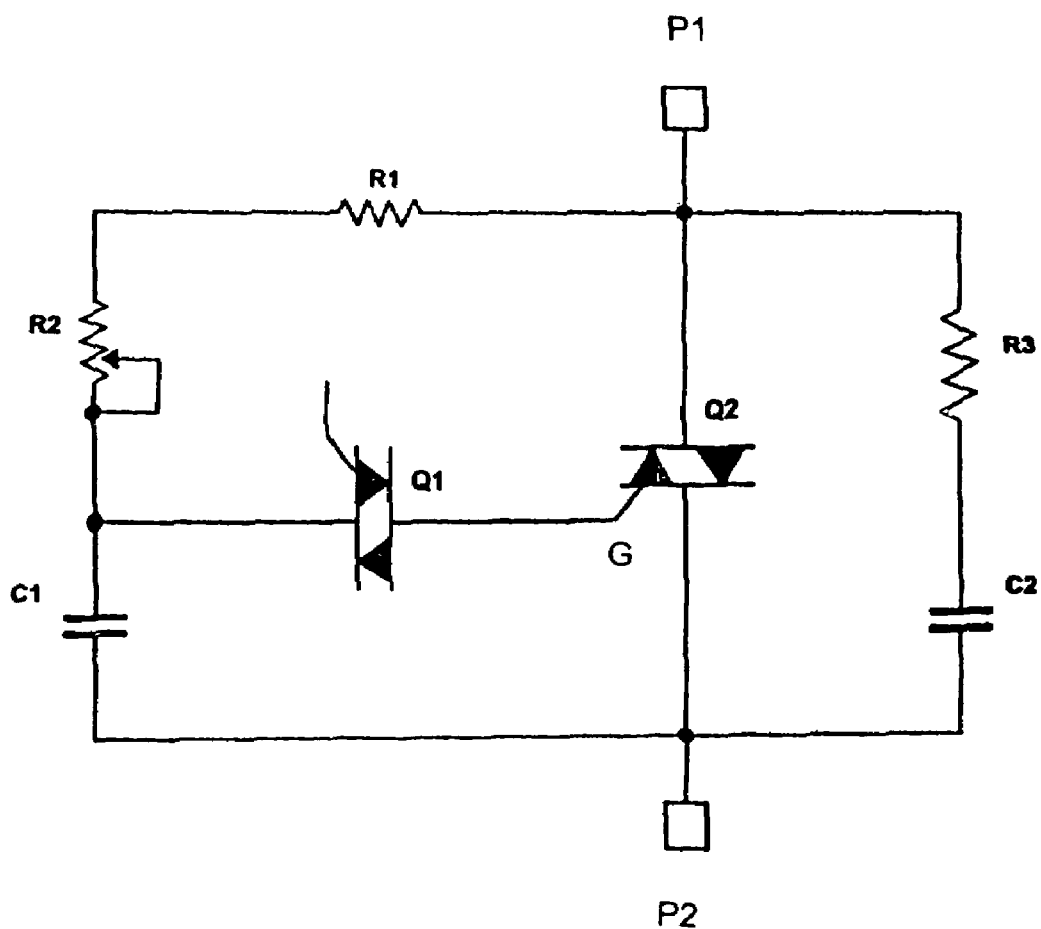
FIG. 8 illustrates an electrical diagram of a clipper circuit that may be used in an embodiment of the claims.

FIG. 8 illustrates a clipper circuit that may be used to reduce the voltage of an AC power source. The clipper circuit may consist of a DIAC Q1 and a TRIAC Q2, (sometimes called an alternistor or a thyristor). This circuit may be designed to cutoff the peak voltage of an alternating signal, thus being called a clipper circuit. Generally, a TRIAC Q2 does not effectively conduct current between its main terminals P1, P2 unless a gate voltage is applied at its gate G terminal. Thus, an AC signal across the TRIAC Q2 will maintain its voltage unless a gate signal is applied, thereby shorting any signal across its main terminals P1,P2 and clipping the signal voltage. The DIAC Q1 blocks applied voltages in either direction until a breakover voltage is applied. Thus, the level of clipping is directly related to the breakover voltage of the DIAC Q1. Resistor R3 and C2 form a snubber circuit which is used to reduce the rate of change of voltage across the TRIAC. Variable resistor R2 and capacitor C1 are used to control the rate of change of voltage across the DIAC, thus providing control over the timing of the clipping mechanism.

The circuit of FIG. 8 may be connected across an AC power source that may be applied to the field coil circuits described above. In another embodiment, the clipper circuit may be further used to charge a battery used to supply DC power to the parallel circuit. In this embodiment, a further rectifying circuit, as is known in the art, may be implemented with the clipper circuit of FIG. 8 before supplying a voltage to the batteries, as illustrated in FIG. 9.

Figure 9:
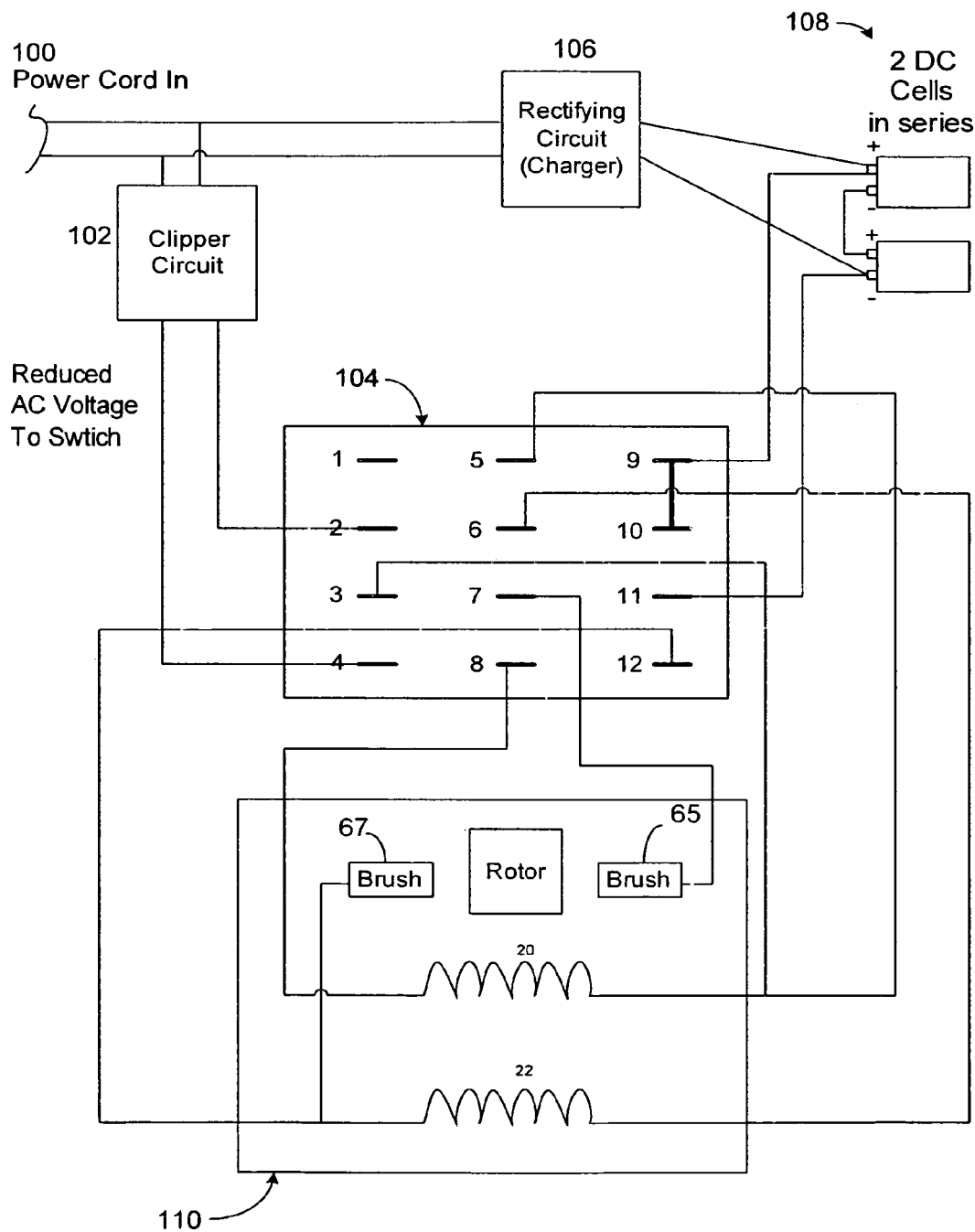
FIG. 9 illustrates a general electrical connection diagram of a clipper circuit, a battery, a switch and a motor in an embodiment of the claims.

FIG. 9 illustrates an overall embodiment of the claimed system. A wall outlet AC power source 100 is fed into a clipper circuit 102. The clipper circuit reduces the effective voltage of the AC power and is channeled to a switch 104. A rectifying circuit 106 may also be connected to the AC power source to provide a DC charging current to a set of batteries 108. In one embodiment, the rectifying circuit charges the batteries while the switch 104 is arranged to channel AC power to the motor. As further illustrated in FIG. 9, switch 104 provides connections to the motor 110. Specifically, the switch 104 provides connections for a series wound circuit connected to AC power when the switch is in a left position and provides connections for a parallel wound circuit connected to the batteries when the switch is in a right position. The circuits and connections are the same as those described above.

Figure 10:
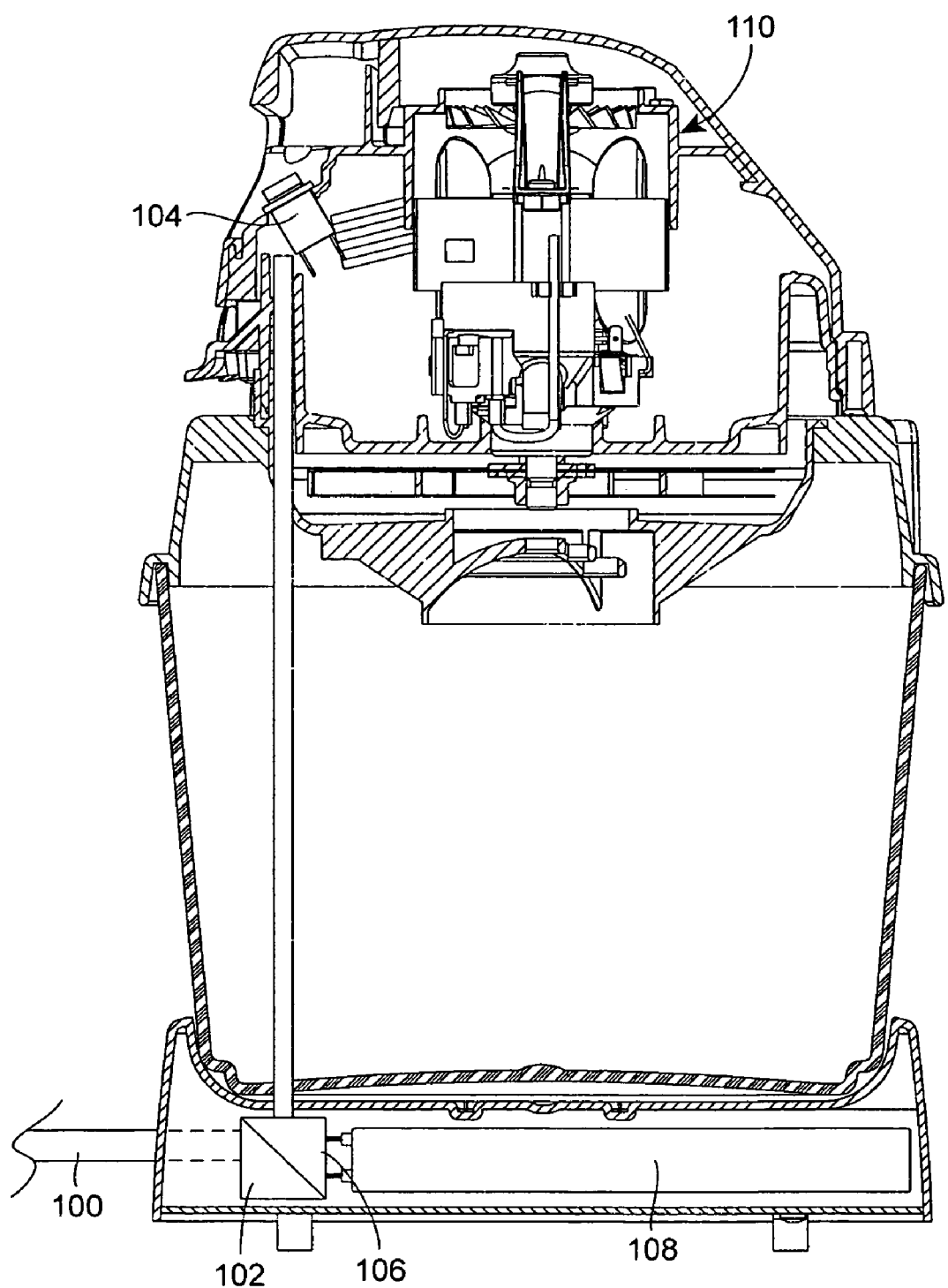
FIG. 10 illustrates a vacuum cleaner which may include a motor in accordance with the claimed invention.

FIG. 110 illustrates a vacuum cleaner embodiment of the claims. Similar components of FIG. 9 are labeled in FIG. 10. In the vacuum cleaner embodiment of FIG. 10, AC outlet power is channeled into the vacuum cleaner device through a power cord 100, which connects to a combination clipper circuit 102 and rectifying circuit 106. A DC battery 108 is connected to the rectifying circuit 106. A wire cord provides the AC and DC power to a switch 104. The switch is coupled to the electric motor 110 as illustrated in FIG. 10 where the wiring may be connected in a similar fashion as illustrated in FIG. 9.

Existing motor systems may rely solely on a DC series wound motor having low power output or a universal motor that may only match the power of a DC battery, i.e., the AC is brought down completely to a DC power level (which may be typically much weaker than original AC power level).

The claimed motor switches from a series wound circuit to a parallel wound circuit when DC operating power is used. Switching from a series wound to parallel wound circuit decreases the effective impedance of the field winding, thereby increasing DC operating power. When the motor is operating on AC power, a series field coil circuit is used to increase impedance and decrease operating power. A clipper circuit may be used across the AC power supply to further reduce the effective AC power supplied to the motor when the motor is operating on AC. The claimed motor increases the average power performance of the motor while decreasing the power discrepancy in motor operation when switching between AC and DC power.

Many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. An electric motor comprising:
   a rotor having a single armature coil and at least one pair of electrical contacts, wherein each pair of electrical contacts defines the ends of a single continuous circuit of the rotor armature coil;
   a stator having a first and a second field coil, wherein the first field coil includes a first end and second end, the second field coil includes a first end and second end, and the first and second field coils are positioned on opposite sides of the stator;
   a first brush and a second brush positioned on opposite sides of the stator wherein the first and second brushes make electrical connections to the electrical contacts on the rotor as the rotor rotates with respect to the stator; and
   a switch arranged to connect a parallel field coil circuit to a source of DC power and arranged to connect a series field coil circuit to a source of AC power;
   wherein the series field coil circuit comprises the first end of the first field coil connected to the first brush, the first end of the second field coil connected to the second brush, the second end of the first field coil connected to a first terminal of the switch and the second end of the second field coil connected to a second terminal of the switch; and
   the parallel field coil circuit comprises the first end of the first field coil connected to a first end of the second field coil, a second end of the first field coil connected to a second end of the second field coil and the second motor brush, and a third terminal of the switch connected to the first end of the first field coil and a fourth terminal of the switch connected to the first brush.

2. The electric motor of claim 1, wherein a clipper circuit is connected across the AC power source and the clipper circuit connects the AC power source to the series field coil circuit during a predetermined period of a half cycle of the AC power source.

3. The electric motor of claim 2, wherein the clipper circuit is connected to a rectifying circuit and the rectifying circuit is connected to a battery.

4. The electric motor of claim 3, wherein the DC power source comprises the battery.

5. The electric motor of claim 2, wherein the clipper circuit comprises a DIAC, a TRIAC, a first resistor, a second resistor, and a capacitor, and wherein the TRIAC is connected between a terminal of the AC power source and the first field coil circuit, and wherein the first resistor, the second resistor, and the capacitor are connected in a series combination, the series combination further connected in parallel with the TRIAC, and wherein the DIAC is connected between the gate of the TRIAC and the junction of the second resistor and the capacitor.

6. The electric motor of claim 5, wherein the second resistor is a variable resistor.

7. The electric motor of claim 5, wherein the clipper circuit further comprises a snubber circuit connected in parallel with the TRIAC.

8. The electric motor of claim 7, wherein the snubber circuit comprises a resistor and a capacitor connected in series.

9. A method of operating an electric motor that includes a series wound field coil circuit having a first end of a first field coil connected to a first motor brush, a first end of a second field coil connected to a second motor brush, and an AC power supply connected between a second end of the first field coil and a second end of the second field coil, and a parallel wound field coil circuit having a first end of the first field coil connected to a first end of the second field coil, a second end of the first field coil connected to a second end of the second field coil and the first motor brush, and a DC power supply connected between the second motor brush and the first end of the first field coil, wherein the first and second motor brush contact a single continuous armature coil circuit;
   the method comprising:
      switching to the series wound field coil circuit when an AC power supply is used and to the parallel wound field coil circuit when a DC power supply is used.

10. The method of claim 9, further comprising the step of connecting a clipper circuit across the AC power supply.

11. A vacuum cleaner comprising:
    a housing with a suction opening;
    a debris collection unit;
    an AC power cord;
    a battery; and
    an electric motor comprising:
       a rotor having at least two electrical contacts that define the ends of a single armature coil circuit;
       a stator having a first and a second field coil, wherein the first field coil includes a first end and a second end, the second field coil includes a first end and a second end, and the first and second field coils are positioned on opposite sides of the stator;
       a first brush and a second brush positioned on opposite sides of the stator wherein the first and second brush make electrical connections to the electrical contacts as the rotor rotates with respect to the stator; and
       a switch that connects a power source to one of a series field coil circuit and a parallel field coil circuit, wherein the power source includes a first terminal and a second terminal;
       wherein the series field coil circuit comprises the first end of the first field coil connected to the first brush, the first end of the second field coil connected to the second brush, the second end of the first field coil connected to the first terminal of the power source and the second end of the second field coil connected to the second terminal of the power source; and
       the parallel field coil circuit comprises the first end of the first field coil connected to a first end of the second field coil, a second end of the first field coil connected to a second end of the second field coil and the second motor brush, and the power source connected between the first end of the first field coil and the first brush.

12. The vacuum cleaner of claim 11, wherein the switch connects the AC power cord to the series field coil circuit and the switch further connects the battery to the parallel field coil circuit.

13. The vacuum cleaner of claim 11, further comprising a clipper circuit connected across the AC power cord, wherein the clipper circuit connects the AC power cord to the series field coil circuit during a predetermined period of a half cycle of the AC power source.

14. The vacuum cleaner of claim 13, wherein the clipper circuit is connected to a rectifying circuit and the rectifying circuit is connected to the battery.

15. The vacuum cleaner of claim 14, wherein the clipper circuit and rectifying circuit provide power to charge the battery when the AC power cord is connected to an AC power supply.

16. The electric motor of claim 11, wherein the switch comprises a four-pole, double throw switch.

17. The electric motor of claim 11, wherein the switch comprises a four pole single throw switch.

18. The electric motor of claim 17, further comprising a second switch for connecting one of the battery and AC power cord to the four pole single throw switch.

* * * * *